US010367733B2

(12) United States Patent
Han (10) Patent No.: US 10,367,733 B2
(45) Date of Patent: Jul. 30, 2019

(54) IDENTIFIER-BASED VIRTUAL NETWORKING

(71) Applicant: Nicira, Inc., Palo Alto, CA (US)

(72) Inventor: Donghai Han, Beijing (CN)

(73) Assignee: Nicira, Inc., Palo Alto, CA (US)

( * ) Notice: Subject to any disclaimer, the term of this patent is extended or adjusted under 35 U.S.C. 154(b) by 170 days.

(21) Appl. No.: 15/474,650

(22) Filed: Mar. 30, 2017

(65) Prior Publication Data

US 2018/0287938 A1    Oct. 4, 2018

(51) Int. Cl.
| | |
|---|---|
| *H04L 12/741* | (2013.01) |
| *H04L 29/12* | (2006.01) |
| *H04L 12/931* | (2013.01) |
| *H04L 12/46* | (2006.01) |

(52) U.S. Cl.
CPC .......... *H04L 45/74* (2013.01); *H04L 12/4633* (2013.01); *H04L 12/4679* (2013.01); *H04L 61/103* (2013.01); *H04L 61/1511* (2013.01); *H04L 61/2514* (2013.01); *H04L 61/2517* (2013.01); *H04L 61/2521* (2013.01); *H04L 61/3015* (2013.01); *H04L 61/6068* (2013.01); *H04L 12/4641* (2013.01); *H04L 49/70* (2013.01); *H04L 61/2007* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 8,964,735 | B2 * | 2/2015 | Ackley | H04L 45/7457 370/389 |
| 9,619,662 | B1 * | 4/2017 | Beda, III | G06F 9/00 |
| 2013/0318219 | A1 | 11/2013 | Kancherla | |
| 2013/0326504 | A1 * | 12/2013 | Tsirkin | G06F 9/45558 718/1 |
| 2015/0106489 | A1 * | 4/2015 | Duggirala | H04L 61/2503 709/222 |
| 2015/0312054 | A1 | 10/2015 | Barabash et al. | |
| 2016/0342439 | A1 * | 11/2016 | Woerndle | H04L 61/2596 |

OTHER PUBLICATIONS

International Search Report and Written Opinion—PCT/US2018/025246—International Searching Authority—European Patent Office—dated Jun. 18, 2018, 14 pages.

\* cited by examiner

*Primary Examiner* — Lonnie V Sweet
(74) *Attorney, Agent, or Firm* — Patterson + Sheridan, LLP (57) ABSTRACT

A computer system provides a method for processing network packets using unique identifiers associated with source and destination virtual machines (VMs). The method includes receiving, from a first VM, a request for address information associated with a second VM, generating and returning one or more arbitrarily assigned addresses for the second VM, mapping a unique identifier of the second VM to the one or more arbitrarily assigned addresses, receiving a packet from the first VM including one or more addresses associated with the first VM and the one or more arbitrarily assigned addresses associated with the second VM, replacing the addresses associated with the first VM with a unique identifier of the first VM and the one or more arbitrarily assigned addresses associated with the second VM with the unique identifier of the second VM, and transmitting the packet to a host machine associated with the second VM.

22 Claims, 5 Drawing Sheets

FIGURE 1

| IP Address | MAC Address | Unique Identifier |
|---|---|---|
| 192.168.100.1 | 4C-F2-2E-1D-DE-0B | 609aed49-fc3b-4f5c-a249-c16a10e57105 |
| 192.168.100.2 | C8-A7-80-28-6B-00 | ffe6daf7-6dc8-46aa-be08-7074873f82c9 |
| 192.168.100.3 | 05-05-76-8C-95-0C | ca81fffd-ce1d-4f96-9ca8-4a5922a7c6a2 |
| ... | ... | ... |

IDENTIFIER-BASED VIRTUAL NETWORKING

BACKGROUND

In virtualized computing systems, host machines generally host a plurality of virtual machines. In hosting virtual machines, a host machine may provide a virtual switch that connects virtual machines running on the host to communicate with other virtual machines hosted on the same host machine as well as virtual machines hosted on other hosts. For example, the virtual machines may be interconnected as part of a logical overlay network. Logical overlay networks may be implemented by the host by encapsulating egress packets from the virtual machines and decapsulating ingress packets. For example, Virtual Extensible Local Area Network (VXLAN) tunnel endpoint (VTEP) services for encapsulating packets (e.g., Geneve packet, VXLAN packet, etc.) may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks. While the term "VTEP" refers to "VXLAN" tunneling protocol, it is now often used regardless of the tunneling protocol. The host may refer to internally-maintained forwarding tables that are populated by a control plane for determining whether to encapsulate packets and the targets of the encapsulation header based on the destination address of the original packet's header.

For example, a source virtual machine may generate an IP/MAC packet with the address of the source virtual machine set as the source address and the address of the destination virtual machine on a different host set as the destination address. The source virtual machine may send the packet to a virtual switch implemented on the same physical host as the source virtual machine. The virtual switch may, in accordance with forwarding tables associated with the virtual switch be connected to a VTEP which encapsulates the packet received from the source virtual machine to generate an encapsulated packet. The original packet may be referred to as an inner packet, and the encapsulated packet may be referred to as an outer packet. Further, a header of the inner packet including the address of the source virtual machine set as the source address and the address of the destination virtual machine set as the destination address may be referred to as an inner header. The VTEP may further include an outer header as part of the outer packet. The outer header may include a source address of the VTEP (e.g., source VTEP) generating and transmitting the encapsulated packet, and further may include a destination address of a VTEP (e.g., destination VTEP) associated with the destination virtual machine. Accordingly, in the overlay network, the outer header is used to forward the encapsulated packet through the overlay network from the source VTEP to the destination VTEP. The destination VTEP may then extract the inner packet and forward the original packet to a virtual switch connected to the destination VTEP, which forwards the original packet to the destination virtual machine based on the inner header of the decapsulated original packet.

To obtain the address of the destination virtual machine, the source virtual machine generally uses IP procedures, such as domain name system (DNS) lookup to obtain an IP address of the destination virtual machine, Dynamic Host Configuration Protocol (DHCP) to obtain IP address and gateway information, Address Resolution Protocol (ARP) or Neighbor Discovery Protocol (NDP) to find virtual machines or gateways, and so on. However, using IP procedures to obtain information about a destination virtual machine generally adds unwanted overhead to communications (e.g., due to the use of procedures relying on network broadcasting).

SUMMARY

One or more embodiments implement a method for processing network packets using unique identifiers associated with source and destination virtual machines. The method includes receiving, from a first virtual machine, a request for address information associated with a second virtual machine, generating one or more arbitrarily assigned addresses for the second virtual machine, returning the one or more arbitrarily assigned addresses to the first virtual machine, mapping a unique identifier of the second virtual machine to the one or more arbitrarily assigned addresses, receiving a packet from the first virtual machine including one or more addresses associated with the first virtual machine and the one or more arbitrarily assigned addresses associated with the second virtual machine, replacing, in the packet, the one or more addresses associated with the first virtual machine with a unique identifier of the first virtual machine and the one or more arbitrarily assigned addresses associated with the second virtual machine with the unique identifier of the second virtual machine, and transmitting the packet to a host machine associated with the second virtual machine.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
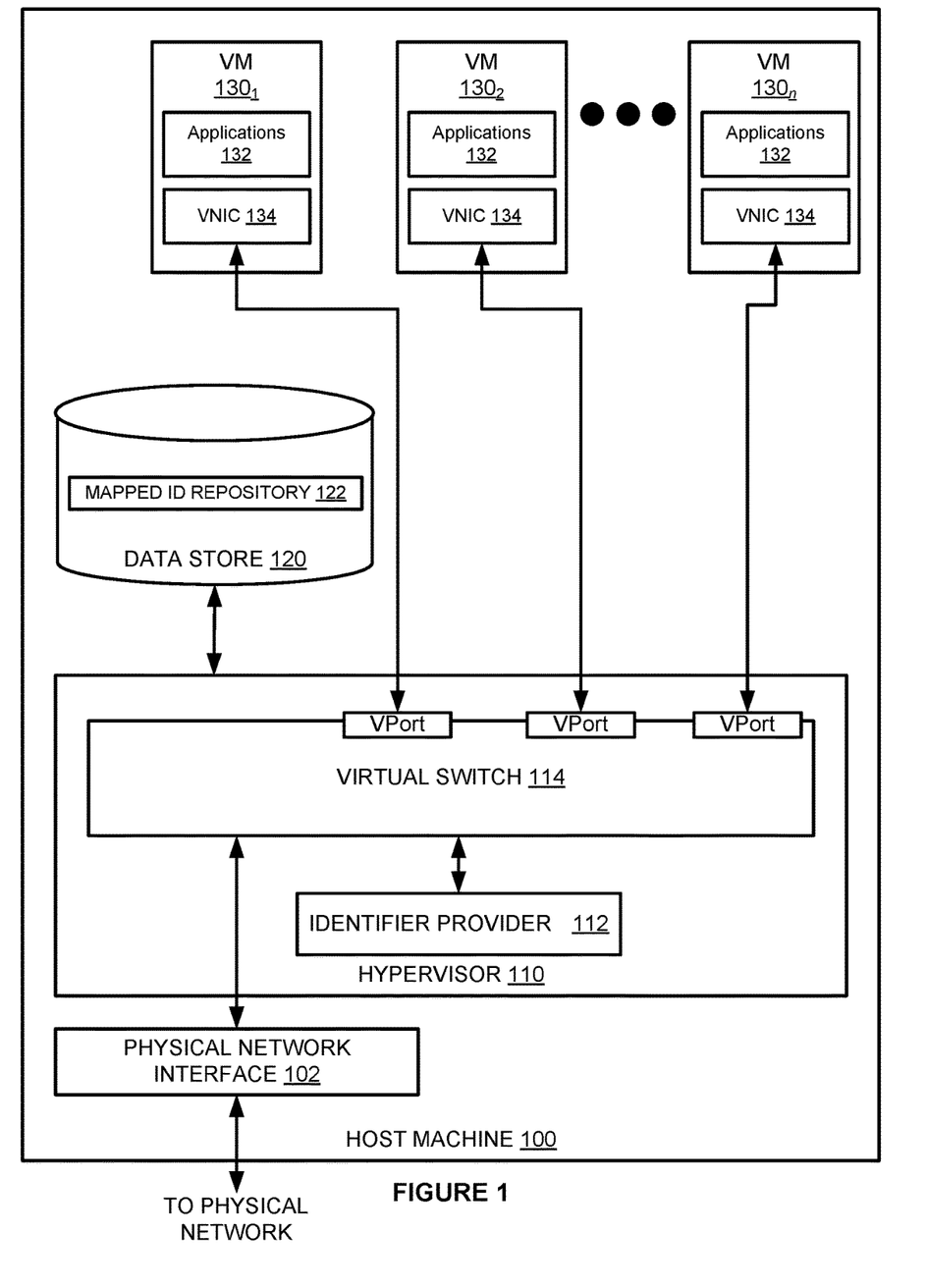
FIG. 1 is a block diagram of a host machine in which virtual networking infrastructure associates virtual machine identifiers to MAC/IP addresses used by a virtual machine in generating packets, according to some embodiments.

FIG. 1 illustrates an example host machine 100, according to some embodiments. As illustrated, host machine 100 includes a physical network interface 102, a hypervisor 110, a data store 120, and a plurality of virtual machines 130. Host machine 100 may provide part of a computing infrastructure including multiple host machines for implementing a logical overlay network. Though certain embodiments are described herein with respect to VMs, the same principals and techniques may also apply to other appropriate virtual computing instances (e.g., containers (e.g., Docker containers), data compute nodes, isolated user space instances, etc.). As shown, hypervisor 110, data store 120, and the plurality of virtual machines 130 reside on host machine 100. In certain embodiments, host machine 100 is a hardware computing platform (e.g., a server, workstation, etc.). For example, host machine 100 includes one or more central processing units (CPUs), system memory, storage, and one or more network interfaces, such as physical network interface 102, for communicating with network destinations outside of host machine 100, such as on other host machines. For example, host machine 100 has access to a physical network through physical network interface 102.

Hypervisor 110 includes a virtual switch 114, which serves as an interface between the hosted virtual machines 130, physical network interface 102, as well as other physical resources available on host machine 100. Hypervisor 110 further includes an identifier provider 112 coupled to or part of the virtual switch 114. In alternate embodiments, virtual switch 114, identifier provider 112, and/or physical device drivers may execute in a privileged virtual machine often referred to as a "Domain zero", "root-", or "parent-partition." Each of the virtual machines 130 includes a virtual network interface card (VNIC) 134, which is responsible for exchanging packets between the virtual machine 130 and hypervisor 110. VNICs 134 may be, in some cases, a software abstraction of a physical network interface card implemented by an emulator and may include a firewall filter for identifying relevant firewall rules and applying the relevant firewall rules for filtering packets. Each virtual machine 130 may be associated with a unique identifier, such as a Universally Unique Identifier (UUID) or Globally Unique Identifier (GUID). In some cases, the identifier associated with a virtual machine may not be guaranteed to be universally unique, but may be drawn from a sufficiently large range of values such that the likelihood of a collision between two identifiers is minimal. Each virtual machine 130 is connected to a virtual port provided by virtual switch 114, and virtual switch 114 is connected to physical network interface 102 to allow network traffic to be exchanged between virtual machines 130 executing on host machine 100 and external network destinations.

Virtual switch 114 generally receives packets from one or more virtual machines 130 for transmission to network destinations including virtual machines on the same host machine, virtual machines on different host machines, or destinations outside of the logical overlay network (e.g., via physical network interface 102). Each packet received from a virtual machine 130 generally includes a header specifying an address (e.g., MAC and/or IP address) of the source virtual machine and destination (e.g., destination virtual machine) and a payload to be processed by the destination. To forward the packet on to the network destination, virtual switch 114 is connected, in accordance with forwarding tables associated with virtual switch 114, to a VTEP, which encapsulates the packet received from the source virtual machine 130 to generate an encapsulated packet and transmits the encapsulated packet to a destination VTEP associated with the destination as discussed. The destination VTEP decapsulates the packet and forwards the original packet to a virtual switch associated with the destination. When virtual switch 114 receives a packet, the virtual switch can read the header and route the packet to the destination.

When an application 132 executing on virtual machine 130 requests address information (e.g., IP address or MAC address) for a network destination (e.g., destination virtual machine), the virtual machine 130 generates network address information requests and transmits the requests to networking infrastructure (e.g., DNS servers, DHCP servers, other virtual machines, and so on). For example, virtual machine 130 may generate DNS lookup requests, ARP requests, etc., to obtain address information for a network destination, which requires significant overhead to process. As discussed, in a logical overlay network, this address information may only be used for routing packets between virtual switches and associated virtual machines, and not for routing between different host machines, which is instead performed based on address information included by the VTEP in an outer header of an encapsulated packet. Thus, the VNIC 134 may only be concerned with the network infrastructure exposed by virtual switch 114, and the inner header of the encapsulated packet discussed above may not be needed, as the encapsulated packet is routed based on the outer header. The virtual networking infrastructure may therefore only need to act as a network address translation (NAT) gateway between the logical overlay network and the physical network.

Because the inner header of an encapsulated packet may not be needed for routing the encapsulated packet between different host machines, an arbitrary IP and MAC address can be used for the destination address information of a destination virtual machine in packets generated by a source virtual machine 130. By assigning and providing to source virtual machine 130 an arbitrary IP and MAC address for a destination virtual machine, hypervisor 110 can reduce the network overhead involved in obtaining the actual IP address and MAC address information associated with the destination virtual machine. Further, virtual switch 114 may be configured to replace the source and destination IP and MAC addresses (including the arbitrary destination IP and MAC addresses) in a packet received from the source virtual machine 130 with unique identifiers of the source virtual machine and destination virtual machine, respectively. Virtual switch 114 may be configured to route the packet to the appropriate virtual machine based on the unique identifiers as further discussed herein. Accordingly, the network stack on each virtual machine 130 need not be modified to accommodate the use of arbitrary IP and MAC addresses for a network destination, as the arbitrary IP and MAC addresses may be replaced in the inner header of an encapsulated packet by the unique identifiers before transmission from the host machine 100 associated with the source virtual machine to the host machine associated with the destination virtual machine as discussed herein.

In some cases, where the network destination is not associated with another virtual machine 130 or where the network destination is otherwise not associated with a unique identifier in a control plane, hypervisor 110 may not provide an arbitrary IP and MAC address in response to a request for address information from application 132 and instead may use normal domain name server (DNS) and address resolution protocol (ARP) procedures to obtain IP address and MAC address information for the network destination. For example, hypervisor 110 may identify network destinations that are not associated with a unique identifier based on a host name included in a request for address information, or based on a mapping of unique identifiers to addresses at the hypervisor 110.

To determine whether to report an arbitrary IP and MAC address to a virtual machine 130 for use in generating packets to a network destination, virtual switch 114 may receive a network address information request including a host name of the network destination from virtual machine 130. In some cases, identifier provider 112 coupled to virtual switch 114 may examine a dataset of mappings between host names and unique identifiers or a dataset of DNS prefixes within the logical overlay network to determine whether the network destination is a destination within the logical overlay network or outside the logical overlay network. If identifier provider 112 finds an entry in the dataset with the host name of the network destination or the same DNS prefix as the network destination, identifier provider 112 can process the network address information request (e.g., intercept the network address information request and respond to the request) to assign arbitrary IP and MAC addresses for the network destination, as discussed in further detail below. Messages including network address information sent from identifier provider 112 to source virtual machine 130 via virtual switch 114 may be transmitted using unicast messaging, which may reduce network overhead within the logical overlay network as compared to the use of broadcast messaging for transmitting DNS and/or ARP messages. Otherwise, if identifier provider 112 does not find an entry in the dataset with the host name of the network destination or the same DNS prefix as the network destination, identifier provider 112 may forward the network address information requests to another server for processing (e.g., DNS server, DHCP server, and the like). By intercepting network address information requests and responding to those requests with arbitrarily chosen IP and MAC addresses, identifier provider 112 can reduce a number of messages transmitted within a network for exchanging network destination address information, reducing overhead in the network.

Identifier provider 112 in hypervisor 110 generally receives requests for network address information from a source virtual machine for a destination virtual machine and returns an arbitrarily chosen IP address and MAC address for the destination virtual machine in response to the requests. The requests for network address information may include, as discussed above, DNS lookup requests, DHCP lookup requests, ARP/NDP messages, and so on. When identifier provider 112 receives a request for network address information (e.g., a DNS query), identifier provider 112 intercepts the request, selects an arbitrary IP address (e.g., an IP address that is not used by the source virtual machine 130 and is on the same subnet as the source virtual machine 130), and returns the arbitrary IP address to the source virtual machine. The identifier provider 112 may select an arbitrary IP address using any suitable method (e.g., sequentially, randomly, pseudo randomly, etc.) Identifier provider 112 can write the selected arbitrary IP address to a table (e.g., mapped ID repository 122 in data store 120) along with the unique identifier (e.g., obtained from a control plane) of the destination virtual machine for which the arbitrary IP address was selected and use the stored mapping to replace destination address information in packets received from a source virtual machine 130 for the destination virtual machine, as discussed in further detail herein.

Identifier provider 112 may additionally assign an arbitrary MAC address to the destination virtual machine in response to a request for network address information from the source virtual machine. In some cases, identifier provider 112 may receive an ARP/NDP request from the source virtual machine (e.g., by intercepting the ARP/NDP request before the request is transmitted outside of the virtual network) requesting a MAC address-IP address mapping for the destination virtual machine. In response, identifier provider 112 can generate and report an arbitrary MAC address to the source virtual machine 130. Identifier provider 112 may write the arbitrary MAC address to, for example, the table in which the IP address-unique ID mapping is stored and to associate the unique ID with the arbitrary IP address and MAC address selected for the destination virtual machine.

Identifier provider 112 and virtual switch 114 may be configured to receive information regarding unique identifiers assigned to virtual machines from a control plane and use the information to map arbitrary addresses to unique identifiers. The control plane may maintain information mapping entities in the logical overlay network including virtual machines to unique identifiers. For example, the control information may store information including mappings of unique identifiers to host names, domain names, actual addresses, etc. of virtual machines. In some aspects, the mappings of all unique identifiers to entities in the logical overlay network may be sent at once (e.g., pushed or pulled) to virtual switch 114 and identifier provider 112 from the control plane and stored in hypervisor 110. In some aspects, the mappings of unique identifiers to entities in the logical overlay network may be sent to virtual switch 114 and identifier provider 112 from the control plane as each mapping is requested by virtual switch 114 and identifier provider 112, such as by providing a host name, domain name, actual address, etc. of an entity for which the unique identifier is requested to the control plane.

In the case where virtual switch 114 and identifier provider 112 request the unique identifier of a destination virtual machine separately for a given network address information request, the request to the control plane for the unique identifier may be made concurrently or in parallel (e.g., substantially in parallel) with the identifier provider 112 assigning the arbitrary addresses to the destination virtual machine and providing the arbitrary addresses to the source virtual machine sending the network address information request. In particular, it is not necessary to have the actual unique identifier of a destination virtual machine to assign arbitrary addresses to the destination virtual machine. For example, the source virtual machine may not send a packet to the destination virtual machine within the time period it takes for virtual switch 114 and identifier provider 112 to receive the unique identifier of the destination virtual machine from the control plane. Further, even if the source virtual machine sends a packet to the destination virtual machine in the time period, the virtual switch 114 and identifier provider 112 can delay finalizing the mapping and sending the packet until the unique identifier of the destination virtual machine is received from the control plane.

The arbitrary IP and MAC addresses may not need to be unique across all host machines in the logical overlay network. In some cases, the arbitrary IP and MAC addresses may be unique to only a specific host machine (e.g., different host machines may assign the same arbitrary IP and MAC addresses to different virtual machines). Because an identifier provider 112 at each host machine 100 may independently manage assignments of arbitrary IP and MAC addresses for the virtual machines hosted on each host machine 100, uniqueness of the arbitrary IP and MAC addresses may be enforced on a per-host-machine basis. In some cases, the arbitrary IP and MAC addresses may be unique to only a port of virtual switch 114 to which virtual machine 130 is connected. In some cases, each port of virtual switch 114 may maintain its own mapping of destination virtual machines (unique identifiers of destination virtual machines) to arbitrarily assigned IP and MAC addresses (e.g., different virtual ports on the same host machine may assign the same arbitrary IP and MAC addresses to different virtual machines). Because a virtual machine 130 may request data from multiple network destinations using the same connection between a VNIC 132 and a virtual port of virtual switch 114, each network destination may be assigned an arbitrary IP and MAC address for network traffic flowing through that virtual port. By enforcing uniqueness at the virtual port level, virtual switch 114 can avoid collisions between virtual machine unique identifiers and the arbitrarily assigned IP and MAC addresses for that port. However, because different virtual machines communicating via connections with different virtual ports provided by virtual switch 114 may maintain independent mappings, enforcing uniqueness at the virtual port level may reduce the processing overhead that may result from enforcing IP address and MAC address uniqueness throughout the logical overlay network. Further, if a virtual machine is moved from one host machine to another host machine, the virtual port information including the mappings between arbitrarily assigned addresses and unique identifiers is moved with the virtual machine, meaning packets are still routed correctly based on the mapping. The mappings may be applied to the port that the migrated virtual machine uses to connect to the virtual switch on the new host machine.

After identifier provider 112 provides the arbitrary IP address and MAC address to a source virtual machine 130, source virtual machine 130 generates one or more packets for the destination virtual machine including the arbitrary IP address and/or MAC address information of the destination virtual machine in the destination address field and the IP address and/or MAC address information of source virtual machine 130 in the source address field of the packet. When these packets are received at virtual switch 114, virtual switch 114 replaces the IP and/or MAC address of source virtual machine 130 with the unique identifier associated with source virtual machine 130 and replaces the IP and/or MAC address of the destination virtual machine with the unique identifier associated with the destination virtual machine. A source VTEP connected to virtual switch 114 may encapsulate the modified packet (including unique identifiers in lieu of IP and/or MAC addresses) in an encapsulated packet or other wrapper and send the encapsulated packet to a destination VTEP connected to a destination virtual switch associated with the destination virtual machine. The destination VTEP may decapsulate the encapsulated packet, and the destination virtual switch may replace the unique identifier of the source virtual machine in the packet with the arbitrary MAC and/or IP address assigned to the source virtual machine for the destination virtual machine by an identifier provider 112, and replace the unique identifier of the destination virtual machine in the packet with the actual MAC and/or IP address of the destination virtual machine. The virtual switch may forward the modified packet to the destination virtual machine over the virtual port the destination virtual machine is connected to.

Virtual switch 114 may be configured to receive information regarding the mapping of the actual IP and/or MAC address to unique identifiers of destination virtual machines connected to virtual switch 114 from the control plane. The control plane may maintain information about entities in the logical overlay network, such as VTEPs, virtual switches, and virtual machines. For example, the control plane may store information including mappings of unique identifiers to actual addresses for virtual machines. Accordingly, the control plane can send to virtual switch 114, the address of a destination virtual machine based on a unique identifier of the destination virtual machine received from virtual switch 114. Further, virtual switch 114 may be configured to cache information locally regarding mappings of unique identifiers to actual addresses (e.g., of virtual machines). In some aspects, the mappings of all unique identifiers to actual addresses in the logical overlay network may be sent at once (e.g., pushed or pulled) to virtual switch 114 from the control plane. In some aspects, the mappings of unique identifiers to actual addresses in the logical overlay network may be sent to virtual switch 114 from the control plane as each mapping is requested by virtual switch 114.

When a destination virtual switch (e.g., virtual switch 114) receives a packet sent from a source virtual machine, virtual switch 114 can examine the packet for unique identifiers associated with the source and destination virtual machines. Virtual switch 114 can replace the unique identifier of the source virtual machine (e.g., in a source address field) with an arbitrarily-chosen IP address and MAC address (e.g., as assigned and included in a mapping to a unique identifier by identifier provider 112). The unique identifier of the destination virtual machine 130 (e.g., in a destination address field) at host machine 100 may be replaced with the actual IP address and MAC address of the destination virtual machine 130 (e.g., the IP address assigned to the virtual machine 130 by virtual switch 114 and the MAC address associated with VNIC 134).

In some cases, where virtual machines 130 implement IPv6, a 16-byte unique identifier, such as a UUID or GUID, may be substituted for an IP address without further modification to a packet. In some cases, however, where virtual machines 130 use IPv4 addresses having a length of 4 bytes, the unique identifiers for the source and destination IP addresses may be placed in one or more options fields in the IP packets encapsulated in an encapsulated packet.

Replacing source and destination machine IP and/or MAC addresses with unique identifiers may allow for the design and implementation of various network services in hypervisor 110 to be simplified. For example, firewalls implemented in hypervisor 110 (not shown) as part of the virtual networking infrastructure may analyze packets based on static unique identifiers associated with a virtual machine instead of IP address and MAC address information associated with a virtual machine. Because a unique identifier may not change, but because IP address and MAC address information may change randomly, a firewall need not continually update its configurations to accurately filter traffic to and from different virtual machines 130 hosted on host machine 100. Rather, for example, a firewall can examine the unique identifier of a virtual machine 130, find a policy associated with the virtual machine 130, and filter packets based on the policy (e.g., to allow certain types of packets or packets from specified destinations to proceed to the specified destination virtual machine while blocking other types of packets or packets from other destinations from reaching the specified destination virtual machine).

Figure 2:
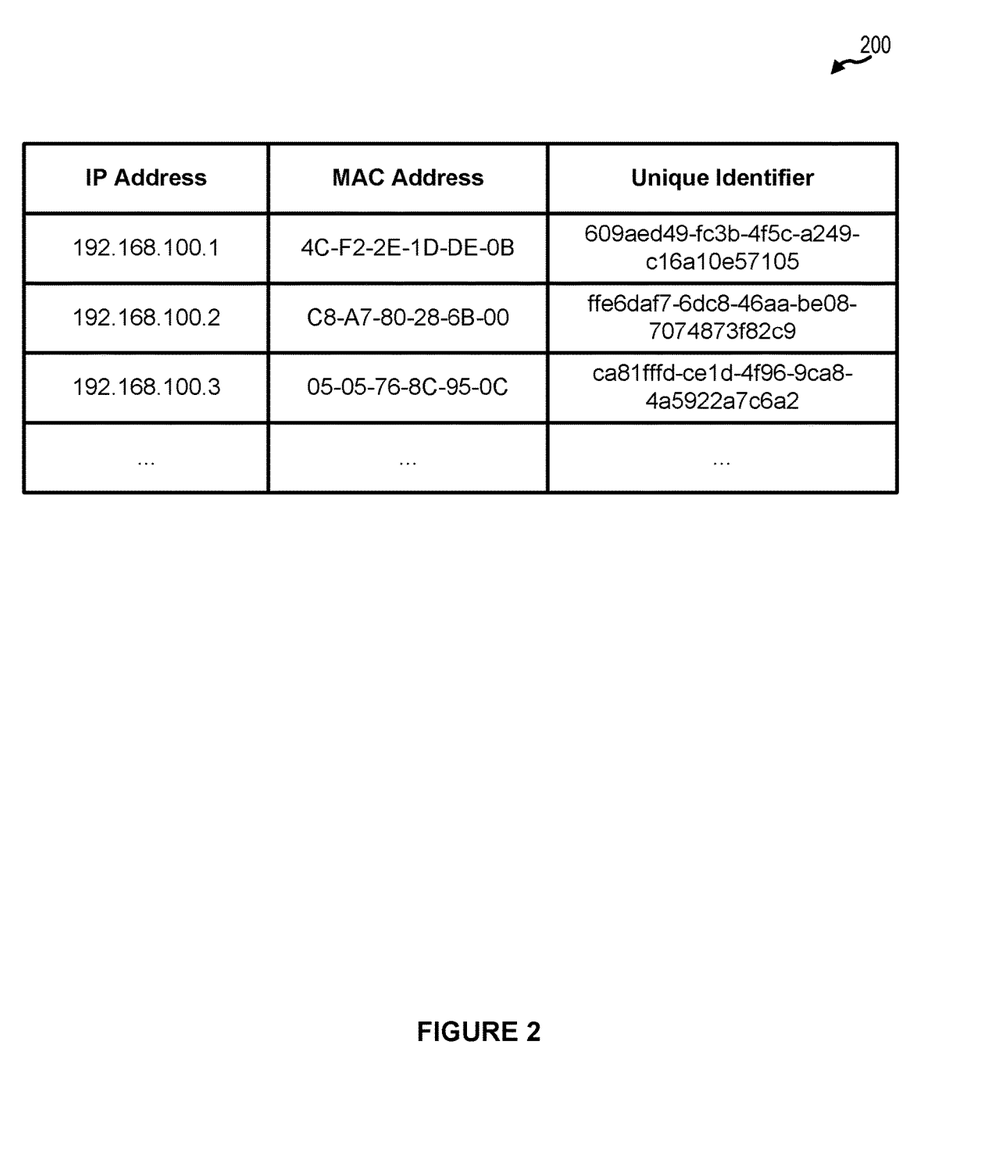
FIG. 2 illustrates an example table of associations between virtual machine identifiers and arbitrarily assigned IP and MAC addresses that may be used as destination address information in network packets generated by a virtual machine, according to some embodiments.

FIG. 2 illustrates an example table in which unique identifiers associated with virtual machines 130 hosted by host machine 100 are mapped to arbitrarily assigned IP addresses and MAC addresses, according to some embodiments. As illustrated, each row in table 200 represents a mapping between a unique identifier of a virtual machine and an arbitrarily assigned IP address and MAC address. The unique identifier may be, for example, a Universally Unique Identifier (UUID) or Globally Unique Identifier (GUID) assigned to the virtual machine 130 by hypervisor 110. In some cases, before identifier provider 112 maps an arbitrary IP address and MAC address to a unique identifier, the unique identifier, arbitrary IP address, and/or arbitrary MAC address may be stored in table 200 without any association (e.g., with null values in the IP address and MAC address fields).

An IP address mapped to a unique identifier may be, in some cases, an IP address that is not used in the virtual network (e.g., not assigned to a virtual machine 130 hosted on host machine 100). The arbitrary IP address assigned to the destination virtual machine and mapped to the unique identifier of the destination virtual machine may be, in some cases, an IP address in the same subnet as the IP address assigned to the source virtual machine. The MAC address may, in some cases, be randomly generated (e.g., in response to an ARP request or an NDP request).

Figure 3:
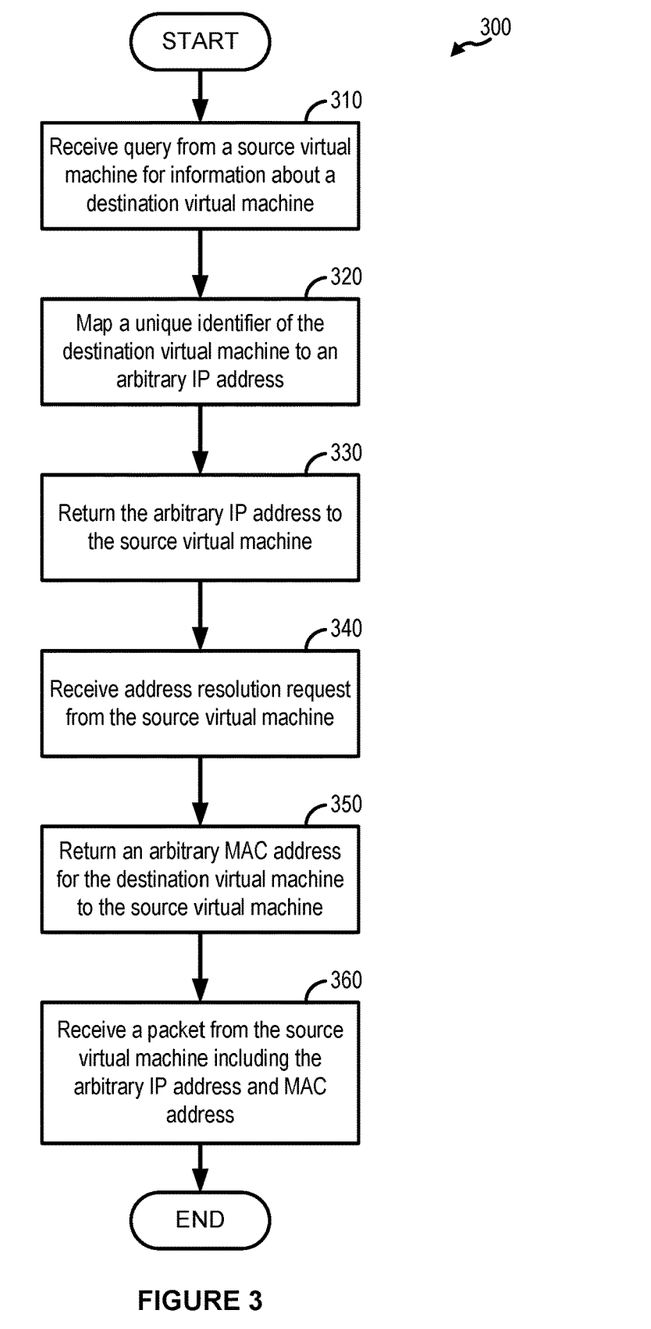
FIG. 3 illustrates example operations that may be performed by virtual networking infrastructure to generate an arbitrary IP and MAC address for a network destination, according to some embodiments.

FIG. 3 illustrates a flow diagram of method 300 for mapping unique identifiers of destination virtual machines to arbitrarily assigned IP addresses and MAC addresses, according to some embodiments. As illustrated, an identifier provider 112 receives requests for IP address and/or MAC address information for a destination virtual machine, generates arbitrary IP addresses and MAC addresses for the specified destination virtual machine, and returns the arbitrary addresses to a source virtual machine 130 for use in constructing packets at the source virtual machine 130.

Method 300 begins at step 310, where identifier provider 112 receives a query from a source virtual machine for information about a destination virtual machine. The query may be, for example, a DNS query or a DHCP query and may include, for example, a name of the destination virtual machine.

In response to receiving the query from a source virtual machine for information about a destination virtual machine, at step 320, identifier provider 112 maps a unique identifier of the destination virtual machine to an arbitrary IP address. As discussed above, each virtual machine in a logical overlay network may be associated with a unique identifier, which may be stored in persistent storage accessible to hypervisor 110 (e.g., data store 120). In mapping a unique identifier of the destination virtual machine to an arbitrary IP address, identifier provider 112 can select an IP address that is unused by other virtual machines on host machine 100 and belongs to the same subnet as the IP address assigned to the source virtual machine 130. At step 330, identifier provider 112 returns the arbitrary IP address to the source virtual machine.

At step 340, identifier provider 112 receives an address resolution request from source virtual machine 130. The address resolution request may be, for example, an ARP request or NDP request that source virtual machine 130 transmits to resolve a MAC address-IP address mapping. At step 350, identifier provider 112 returns, to the source virtual machine, an arbitrary MAC address for the destination virtual machine. The arbitrary MAC address may be a randomly generated address, and identifier provider 112 may map the arbitrary MAC address to the arbitrary IP address generated for the specified destination virtual machine.

At step 360, virtual switch 114 receives a packet from the source virtual machine including the arbitrary IP address and MAC address. The arbitrary IP address and MAC address may be stored in a destination address field of the received packet. The source address field of the received packet may be populated by the IP address assigned to VNIC 134 of the source virtual machine 130.

Figure 4:
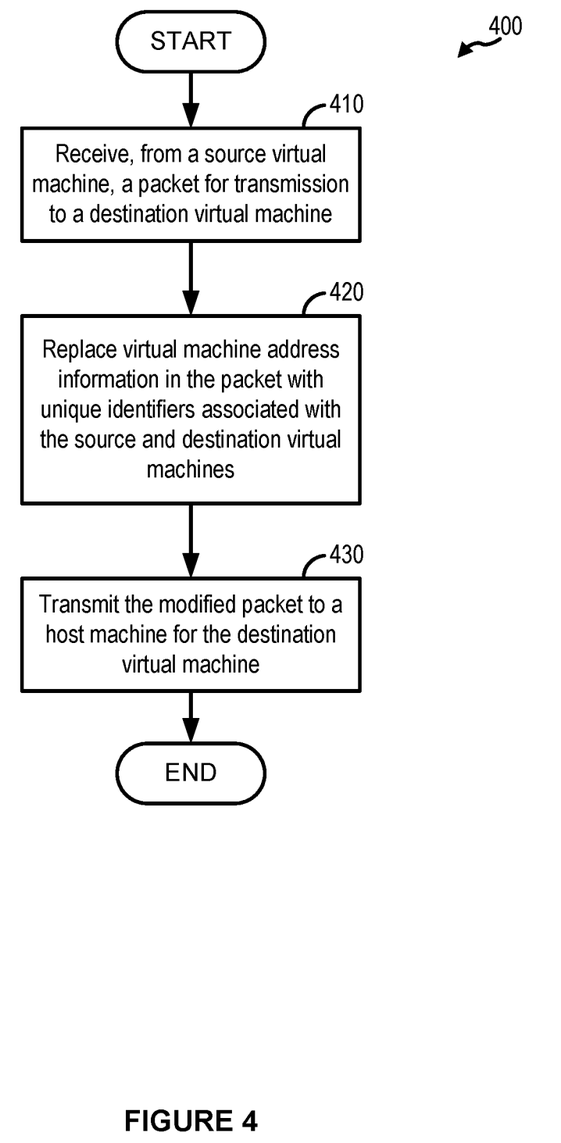
FIG. 4 illustrates example operations that may be performed by virtual networking infrastructure to modify packets for transmission from a source virtual machine to a destination virtual machine based on a mapping of IP addresses to virtual machine identifiers, according to some embodiments.

FIG. 4 illustrates a flow diagram of method 400 for processing a packet for transmission to a destination host machine based on a mapping between arbitrary IP addresses and MAC addresses and a unique identifier of the destination virtual machine, according to some embodiments.

Method 400 begins at step 410, where virtual switch 114 receives, from a source virtual machine 130, a packet for transmission to a destination virtual machine. As discussed herein, the packet may include the IP address assigned to VNIC 134 of source virtual machine 130 in the source address field of the packet and may include the arbitrary IP address assigned to the destination virtual machine by identifier provider 112 in the destination address field of the packet.

At step 420, virtual switch 114 replaces virtual machine address information in the packet with unique identifiers associated with the source and destination virtual machines. To modify the packet, virtual switch 114 examines a repository of virtual machine unique identifiers (e.g., stored at a control plane and/or locally at a host machine of virtual switch 114), obtains the unique identifier associated with a virtual machine identified in the packet, and replaces the IP address in the source or destination address fields of the packet with the unique identifier associated with that virtual machine.

At step 430, virtual switch 114 transmits the modified packet to a host machine associated with the destination virtual machine. To transmit the modified packet, virtual switch 114 may encapsulate the modified packet in, for example, an encapsulated packet. The header of the encapsulated packet may be used to route the packet to the appropriate host machine, and as discussed in further detail below, the payload of the encapsulated packet (including the header of the modified packet) may be parsed to route the payload to the destination virtual machine. The header of the encapsulated packet may include, for example, the IP address of the source VTEP associated with the source virtual machine in the source address field and the IP address of the destination VTEP associated with the destination virtual machine in the destination address field.

Figure 5:
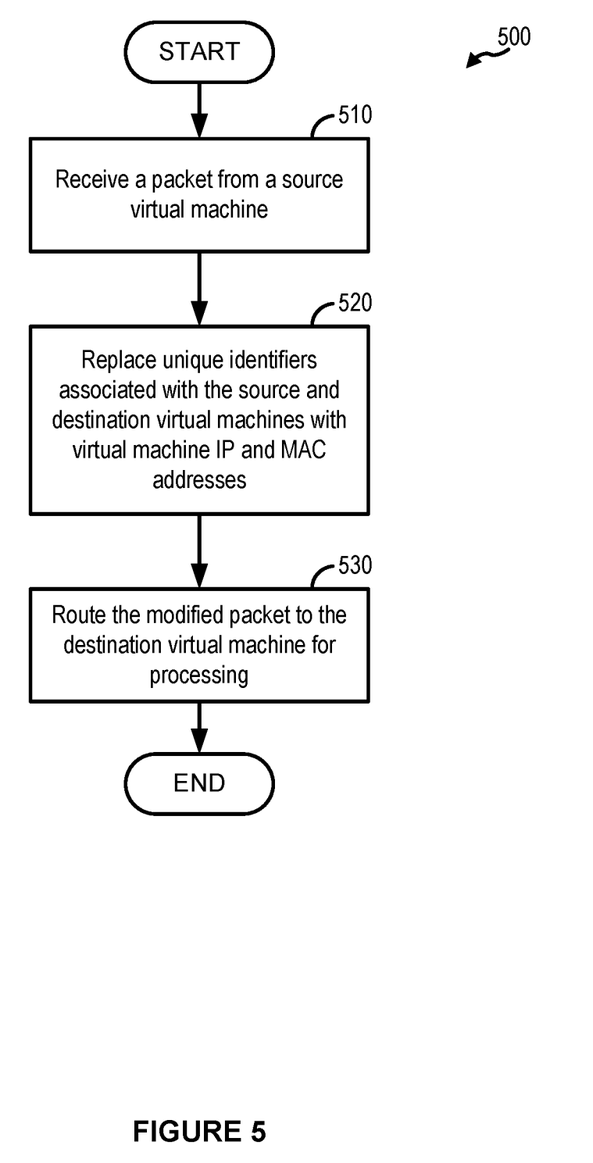
FIG. 5 illustrates example operations that may be performed by virtual networking infrastructure to route packets to a destination virtual machine based on a mapping of IP addresses to virtual machine identifiers, according to some embodiments.

FIG. 5 illustrates a flow diagram of method 500 for processing a received packet and routing the packet to a destination virtual machine based on mappings between virtual machine unique identifiers and IP addresses, according to some embodiments. As illustrated, at step 510, virtual switch 114 receives a packet from a source virtual machine. The packet may be, for example, the inner packet of an encapsulated packet received by a VTEP connected to virtual switch 114.

At step 520, virtual switch 114 replaces the unique identifiers associated with the source and destination virtual machines with virtual machine IP addresses and MAC addresses. To replace unique identifiers with IP addresses and MAC addresses, virtual switch 114 searches for a mapping between a unique identifier included in a packet in mapped ID repository 122. In some cases, virtual switch 114 replaces the unique identifier of the destination virtual machine with the IP address and MAC address assigned to the VNIC 134 of destination virtual machine 130 and replaces the unique identifier of the source virtual machine with an arbitrary IP address and MAC address (e.g., the IP address and MAC address mapped to the unique identifier of the source virtual machine in mapped ID repository 122). At step 530, virtual switch 114 routes the modified packet to the destination virtual machine for processing.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
   receiving, from a first virtual machine, a request for address information associated with a second virtual machine;
   generating, by an identifier provider of a hypervisor coupled to a virtual switch, one or more arbitrarily assigned addresses for the second virtual machine;
   returning, by the identifier provider, the one or more arbitrarily assigned addresses to the first virtual machine;
   mapping a unique identifier of the second virtual machine to the one or more arbitrarily assigned addresses, wherein the unique identifier comprises information other than an IP address associated with the second virtual machine;
   receiving a packet from the first virtual machine including one or more addresses associated with the first virtual machine and the one or more arbitrarily assigned addresses associated with the second virtual machine;
   replacing, in the packet, the one or more addresses associated with the first virtual machine with a unique identifier of the first virtual machine and the one or more arbitrarily assigned addresses associated with the second virtual machine with the unique identifier of the second virtual machine; and
   transmitting the packet to a host machine associated with the second virtual machine.

2. The method of claim 1, further comprising requesting the unique identifier of the second virtual machine from a control plane substantially in parallel with generating the one or more arbitrarily assigned addresses.

3. The method of claim 1, wherein the first virtual machine is associated with a second host machine, and further comprising:
   running a plurality of virtual machines connected to a plurality of ports of a virtual switch on the second host machine; and
   maintaining a separate mapping of unique identifiers to arbitrarily assigned addresses for each of the plurality of ports.

4. The method of claim 1, wherein mapping the unique identifier of the second virtual machine to the one or more arbitrarily assigned addresses comprises mapping, to the unique identifier of the second virtual machine, an unused internet protocol (IP) address in a same subnet as an IP address associated with the first virtual machine.

5. The method of claim 1, wherein mapping the unique identifier of the second virtual machine to the one or more arbitrarily assigned addresses comprises randomly generating a media access control (MAC) address and mapping the randomly generated MAC address to the unique identifier of the second virtual machine.

6. The method of claim 1, wherein transmitting the packet to the host machine associated with the second virtual machine comprises encapsulating the packet.

7. The method of claim 1, wherein the request for address information associated with a second virtual machine comprises one or more of a Domain Name Server (DNS) query and an Address Resolution Protocol (ARP) query.

8. The method of claim 1, further comprising:
receiving, from the host machine associated with the second virtual machine, a second packet addressed to the first virtual machine;
replacing, in the second packet, the unique identifier of the first virtual machine with the one or more addresses assigned to the first virtual machine;
replacing, in the second packet, the unique identifier of the second virtual machine with the one or more arbitrarily assigned addresses associated with the second virtual machine; and
routing the packet to the first virtual machine for processing.

9. The method of claim 1, wherein replacing, in the packet, the one or more addresses associated with the first virtual machine with the unique identifier of the first virtual machine and the one or more arbitrarily assigned addresses associated with the second virtual machine with the unique identifier of the second virtual machine comprises writing the unique identifiers associated with the first and second virtual machines to one or more optional fields in the packet.

10. The method of claim 1, wherein the one or more arbitrarily assigned addresses comprise an internet protocol (IP) address, and a media access control (MAC) address.

11. A non-transitory computer readable medium comprising instructions to be executed in a computer system to cause the computer system to carry out a method for processing packets based on unique identifiers associated with virtual machines, said method comprising:
receiving, from a first virtual machine, a request for address information associated with a second virtual machine;
generating, by an identifier provider of a hypervisor coupled to a virtual switch, one or more arbitrarily assigned addresses for the second virtual machine;
returning, by the identifier provider, the one or more arbitrarily assigned addresses to the first virtual machine;
mapping a unique identifier of the second virtual machine to the one or more arbitrarily assigned addresses, wherein the unique identifier comprises information other than an IP address associated with the second virtual machine;
receiving a packet from the first virtual machine including one or more addresses associated with the first virtual machine and the one or more arbitrarily assigned addresses associated with the second virtual machine;
replacing, in the packet, the one or more addresses associated with the first virtual machine with a unique identifier of first virtual machine and the one or more arbitrarily assigned addresses associated with the second virtual machine with the unique identifier of the second virtual machine; and
transmitting the packet to a host machine associated with the second virtual machine.

12. The non-transitory computer readable medium of claim 11, wherein mapping a unique identifier of the second virtual machine to the one or more arbitrarily assigned addresses comprises mapping, to the unique identifier of the second virtual machine, an unused internet protocol (IP) address in a same subnet as an IP address associated with the first virtual machine.

13. The non-transitory computer readable medium of claim 11, wherein mapping the unique identifier of the second virtual machine to one or more arbitrarily assigned addresses comprises randomly generating a media access control (MAC) address and mapping the randomly generated MAC address to the unique identifier of the second virtual machine.

14. The non-transitory computer readable medium of claim 11, wherein transmitting the packet to the host machine associated with the second virtual machine comprises encapsulating the packet.

15. The non-transitory computer readable medium of claim 11, wherein the method further comprises:
receiving, from the host machine associated with the second virtual machine, a second packet addressed to the first virtual machine;
replacing, in the second packet, the unique identifier of the first virtual machine with the one or more addresses assigned to the first virtual machine;
replacing, in the second packet, a unique identifier associated with the second virtual machine with the one or more arbitrarily assigned addresses associated with the second virtual machine; and
routing the packet to the first virtual machine for processing.

16. The non-transitory computer readable medium of claim 11, wherein replacing, in the packet, the one or more addresses associated with the first virtual machine with the unique identifier of the first virtual machine and the one or more arbitrarily assigned addresses associated with the second virtual machine with the unique identifier of the second virtual machine comprises writing the unique identifiers associated with the first and second virtual machines to one or more optional fields in the packet.

17. A computer system comprising:
a plurality of hosts, each having one or more virtual computing instances deployed thereon; and
a network hypervisor configured to carry out a method for processing packets based on unique identifiers associated with virtual machines by:
receiving, from a first virtual machine, a request for address information associated with a second virtual machine;
generating, by an identifier provider of a hypervisor coupled to a virtual switch, one or more arbitrarily assigned addresses for the second virtual machine;
returning, by the identifier provider, the one or more arbitrarily assigned addresses to the first virtual machine;
mapping a unique identifier of the second virtual machine to the one or more arbitrarily assigned addresses, wherein the unique identifier comprises information other than an IP address associated with the second virtual machine;
receiving a packet from the first virtual machine including one or more addresses associated with the first virtual machine and the one or more arbitrarily assigned addresses associated with the second virtual machine;

replacing, in the packet, the one or more addresses associated with the first virtual machine with a unique identifier of the first virtual machine and the one or more arbitrarily assigned addresses associated with the second virtual machine with the unique identifier of the second virtual machine; and transmitting the packet to a host machine associated with the second virtual machine.

18. The computer system of claim 17, wherein mapping the unique identifier of the second virtual machine to the one or more arbitrarily assigned addresses comprises mapping, to the unique identifier of the second virtual machine, an unused internet protocol (IP) address in a same subnet as an IP address associated with the first virtual machine.

19. The computer system of claim 17, wherein mapping the unique identifier of the second virtual machine to the one or more arbitrarily assigned addresses comprises randomly generating a media access control (MAC) address and mapping the randomly generated MAC address to the unique identifier of the second virtual machine.

20. The computer system of claim 17, wherein transmitting the packet to the host machine associated with the second virtual machine comprises encapsulating the packet.

21. The computer system of claim 17, wherein the method further comprises:

receiving, from the host machine associated with the second virtual machine, a second packet addressed to the first virtual machine;

replacing, in the second packet, the unique identifier of the first virtual machine with the one or more addresses assigned to the first virtual machine;

replacing, in the second packet, the unique identifier of the second virtual machine with the one or more arbitrarily assigned addresses associated with the second virtual machine; and routing the packet to the first virtual machine for processing.

22. The computer system of claim 17, wherein replacing, in the packet, the one or more addresses associated with the first virtual machine with the unique identifier of the first virtual machine and the one or more arbitrarily assigned addresses associated with the second virtual machine with the unique identifier of the second virtual machine comprises writing the unique identifiers associated with the first and second virtual machines to one or more optional fields in the packet.

* * * * *